United States Patent [19]

Lang et al.

[11] Patent Number: 4,555,975
[45] Date of Patent: Dec. 3, 1985

[54] HYDRAULIC STEERING

[75] Inventors: Armin Lang, Schwäbisch Gmünd; Helmut Knödler, Lorch, both of Fed. Rep. of Germany

[73] Assignee: Zahnradfabrik Friedrichshafen, AG., Friedrichshafen, Fed. Rep. of Germany

[21] Appl. No.: 381,708

[22] Filed: May 25, 1982

[30] Foreign Application Priority Data

Jun. 5, 1981 [DE] Fed. Rep. of Germany ....... 3122368

[51] Int. Cl.⁴ .............................................. F15B 15/17
[52] U.S. Cl. ..................................... 91/417 R; 91/434
[58] Field of Search ................. 91/370, 371, 372, 373, 91/375 R, 417 R, 434

[56] References Cited

U.S. PATENT DOCUMENTS

| | | | |
|---|---|---|---|
| 2,424,806 | 7/1947 | Eaton | 91/434 |
| 2,730,075 | 1/1956 | Edge et al. | 91/434 |
| 3,110,321 | 11/1963 | Broad | 91/375 |
| 3,922,953 | 12/1975 | Strauff | 91/434 |
| 3,954,149 | 5/1976 | Strauff | 91/434 |
| 3,967,537 | 7/1976 | Strauff | 91/372 |
| 4,022,110 | 5/1977 | Strauff | 91/371 |
| 4,051,766 | 10/1977 | Strauff | 91/434 |

FOREIGN PATENT DOCUMENTS 1084589  6/1960  Fed. Rep. of Germany .

Primary Examiner—Edward K. Look
Attorney, Agent, or Firm—Zalkind & Shuster

[57] ABSTRACT

A hydraulic power steering system having an unbalanced piston servomotor and a pair of identical control valve pistons controlling flow of pressurized fluid to the servomotor for balanced directional displacement of the servomotor piston and to separately control depressurization of feedback chambers acting on the control valve pistons. Pressurized fluid is supplied directly to the feedback chambers from the servo-steering pump through flow restrictors, one of which is externally adjusted to select the degree of road sensing feedback generated to oppose manual actuation of the control valve pistons.

17 Claims, 5 Drawing Figures

HYDRAULIC STEERING

BACKGROUND OF THE INVENTION

This invention relates to a hydraulic power steering system for automotive vehicles of a type having a servo motor with a differential piston surface area and a control valve provided with a feedback facility.

According to German Patent Publication No. 1,084,589, a power steering mechanism is disclosed which includes a servo motor having an opposed piston surface area ratio of 1:2 and an associated steering control valve controlling two pairs of valve passages through which pressurized fluid is conducted only to one of the pressure chambers of the servo motor acting on the larger of the piston surfaces. The servo motor chamber containing fluid acting on the smaller of the piston surfaces is in constant fluid communication with the power steering pump associated with the steering mechanism. The foregoing power steering arrangement is also provided with feedback means to control the fluid power exerted on the vehicle steering linkage as a function of the effective pressure in the servo motor. The control valve is arranged to be axially displaced when actuated from one side of the steering gear mechanism opposite the side facing the driver from which the steering spindle extends. In the foregoing power steering arrangement, the pump provides a source of constant fluid flow.

The foregoing prior art power steering arrangement is advantageously simple and safe in operation because the valve piston associated with the control valve is positively controlled in both directions of displacement. However, there is a structional disadvantage in such arrangement because of high frictional forces adversely affecting operation of the feedback means which also prevents the control valve from being directly actuated through the steering spindle. Direct control valve actuation through the steering spindle has been recently imposed as a requirement for private automotive vehicles in particular because of steering sensitivity and precision demands.

The referred to disadvantages in the foregoing prior art power steering arrangement have been overcome in a power steering arrangement as disclosed in German Patent Publication No. 2 165 724, or in U.S. Pat. No. 4,051,766 to Strauff by effecting control through the side of the control valve facing the driver. Accordingly, the steering spindle is directly connected to the control valve assembly which utilizes the same dual control valve passage concept for controlling supply of pressurized fluid to both the servo motor and the feedback facility. Furthermore, provision is made to limit development of feedback pressure allowing a further increase in pressure in the servo motor without any noticeable increase in the feedback moment applied to the steering handwheel once the valve actuating moment has reached a certain value. Also, instead of providing a source of constant flow, a source of constant pressure is provided in the latter power steering arrangement. However, the latter power steering arrangement has the disadvantage of requiring feedback surfaces of different sizes. Furthermore, the valve piston of the control valve is not safeguarded against unintentional steering movements in the event it gets stuck.

It is therefore an object of the present invention to provide a power steering system having an unbalanced servo motor of the aforementioned type which does not have the aforementioned disadvantages of the prior art arrangements. An additional object of the present invention is to provide a fluid power steering system having a feedback facility that may be adjusted by a control external to the power steering gear mechanism.

SUMMARY OF THE INVENTION

The present invention is associated with a fluid power steering system wherein the servo motor has unbalanced pressure chambers in that they act on opposed piston surfaces having a piston surface ratio of approximately 1:2, the pressure chambers being pressurized under control of a control valve provided with two main control valve passages through which pressurized fluid is conducted. Two valve pistons of the control valve are actuated by means of a balance lever so that the main control valve passages are closed in response to a spring bias and opened under driver actuated moments applied to the balance lever. Additional auxiliary control valve passages control depressurization of feedback chambers as a function of valve placement. Thus, the auxiliary feedback controlling passages are closed by displacement of the valve pistons when positively engaged by the balance lever. Pressurized fluid to the feedback chambers is supplied through two branch lines within which flow restrictors are disposed. An additional flow restrictor that is adjustable is disposed in a feedback pressure line from the servo pump connected in common to both of the inlet sides of the aforementioned pair of flow restrictors respectively connected to the feedback chambers. The foregoing arrangement provides for safe and positive fluid power steering control by means of two relatively small valve pistons of identical dimensions.

BRIEF DESCRIPTION OF DRAWING FIGURES

The invention will be hereinafter described in greater detail with respect to specific embodiments by reference to the accompanying drawings, in which.

DETAILED DESCRIPTION OF PREFERRED EMBODIMENTS

Figure 2:
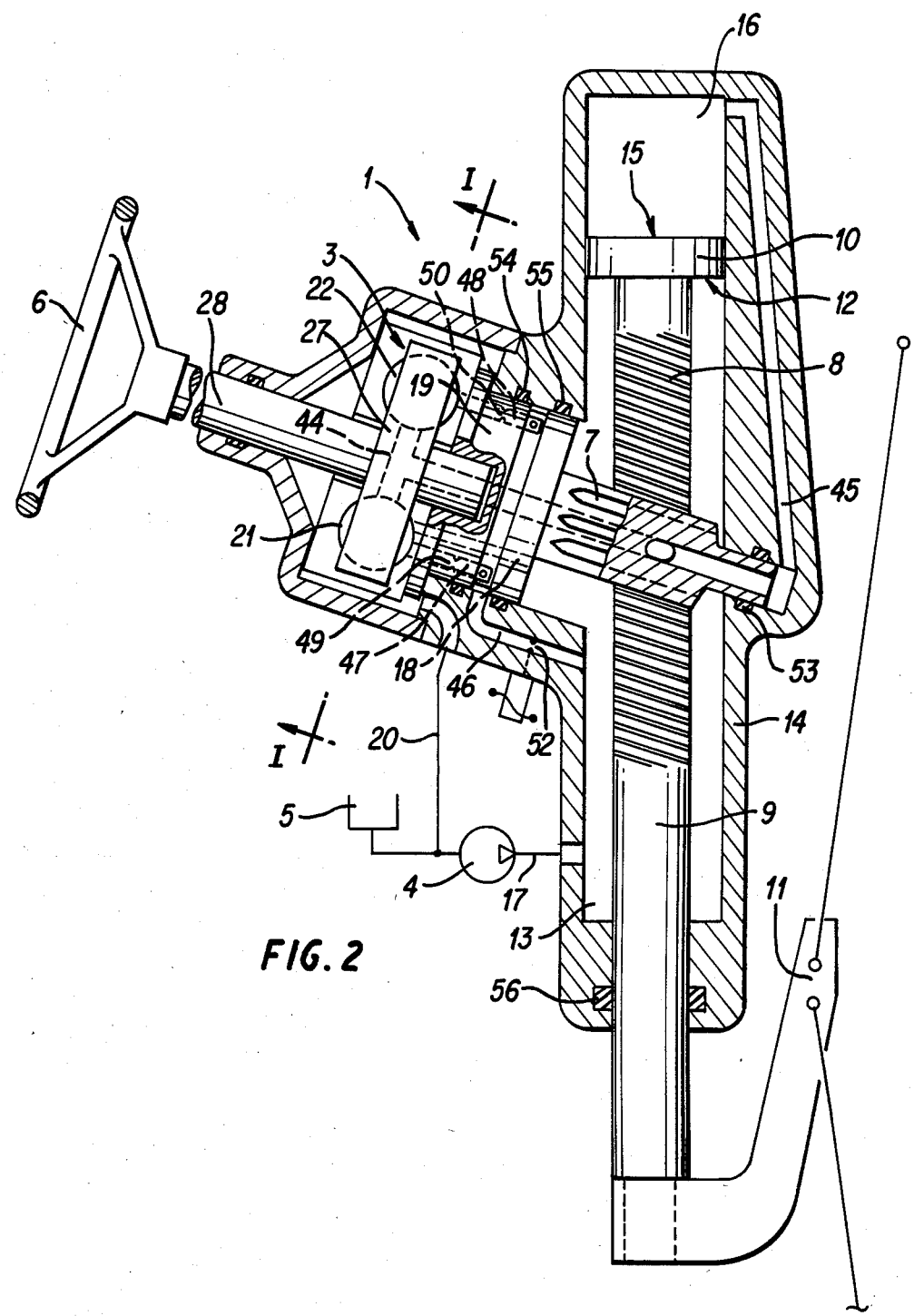
FIG. 2 is a side section view through a steering gear mechanism corresponding to the steering mechanism shown in FIG. 1.

Referring now to the drawings in detail, FIG. 2 illustrates a hydraulic steering gear mechanism 1 having an unbalanced servomotor section 2 to which pressurized fluid is fed through a control valve section 3. The fluid is drawn from a reservoir 5 by a power steering pump 4 through which it is pressurized to form a hydraulic steering system with the steering gear 1. Incorporated within the steering gear is a pinion 7 enmeshed with a rack 8 forming part of a piston rod 9 connected at one axial end to a servo piston 10. The piston rod 9 is mechanically connected by steering linkage 11 to the vehicle wheels (not shown) for steering movement thereof.

The piston rod 9 extends from one axial side surface 12 of the piston 10 smaller than the other axial side surface 15. A pressure cylinder 4 encloses a chamber 13 about the piston rod within the servomotor section. Chamber 13 is smaller in cross-sectional area than the chamber 16.

An inflow pressure line 17 conducts fluid from pump 4 directly into the small cylinder chamber 13 from which the fluid is conducted through a passage 18 (shown in dotted line in FIG. 2) into a rotatable housing body 19 of the control valve section 3.

Figure 1:
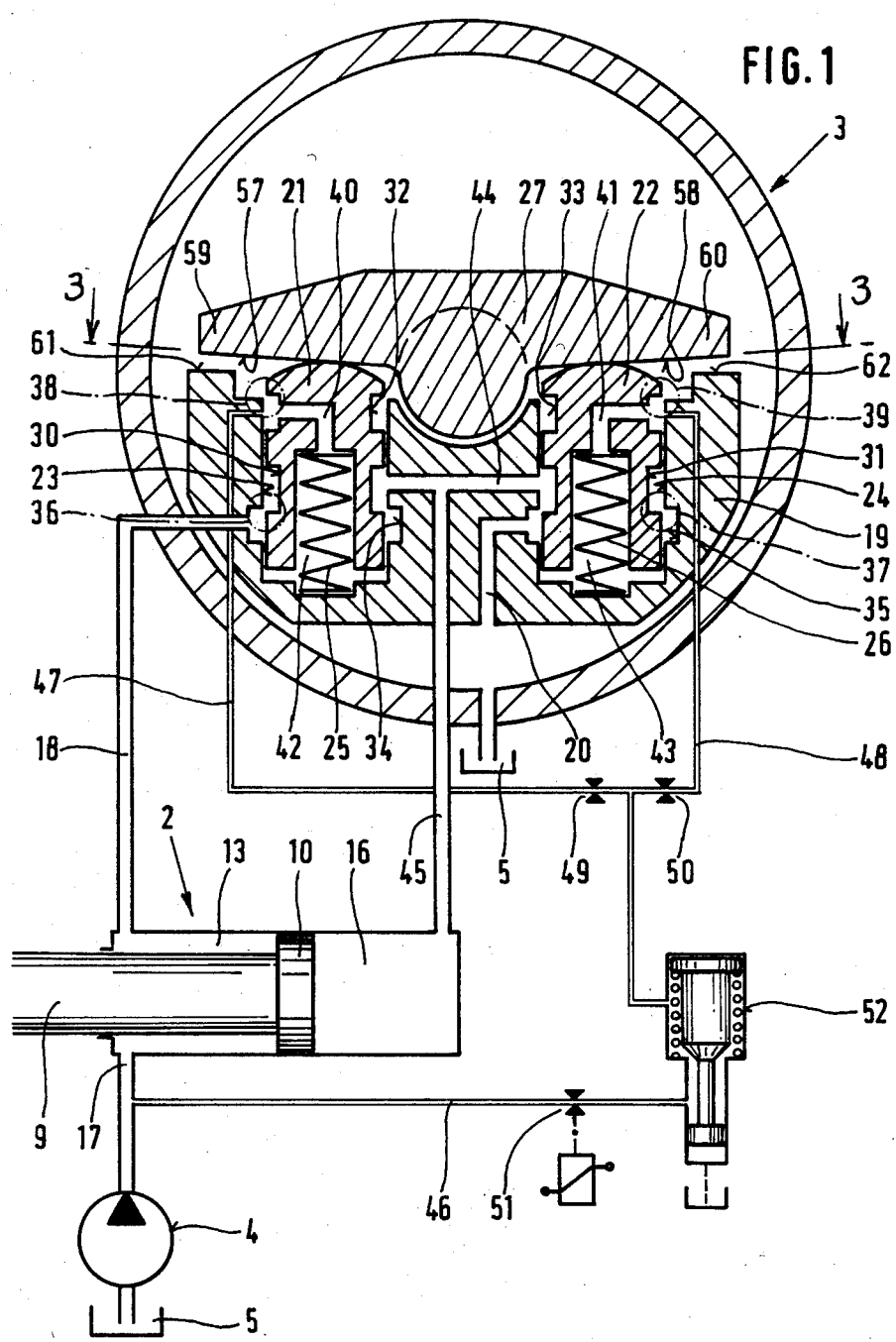
FIG. 1 is a schematic illustration of a steering mechanism in accordance with one embodiment of the present invention, including a section view through the control valve in a neutral position.

As more clearly seen in FIG. 1, two valve pistons 21 and 22 of equal size are mounted adjacent each other within bores 23 and 24 formed in the valve body 19 for axial displacement. Springs 25 and 26 axially bias the valve pistons against a balance lever 27 on opposite sides of a steering spindle to which the balance lever is rigidly connected. A steering handwheel 6 is connected to the spindle 28 while the rotatable valve body 19 is connected to the pinion 7 as shown in FIG. 2.

Figure 3:
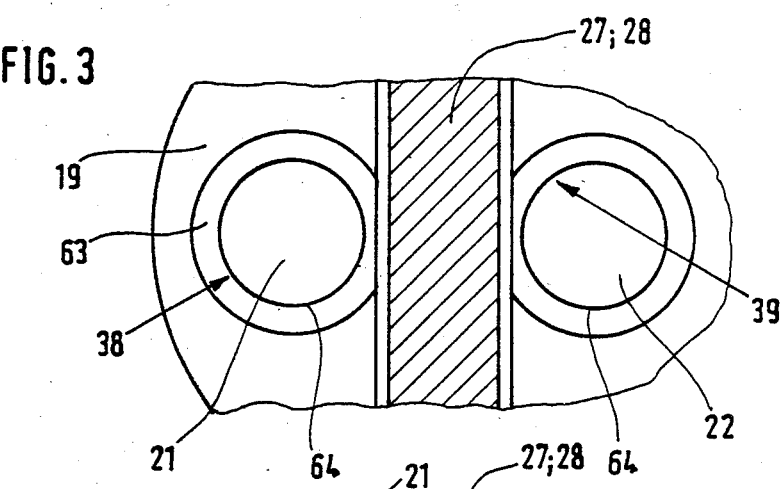
FIG. 3 is a top view of a portion of the control valve construction taken substantially through a plane indicated by section 3—3 in FIG. 1.

With continued reference to FIG. 1, the valve pistons 21 and 22 are provided with annular control grooves 30 and 31 and feedback grooves 32 and 33 adjacent the ends bearing against the balance lever. Control valve passages are formed at 36 and 37 between the valve body and the grooves 30 and 31 and at 38 and 39 between the valve body and the grooves 32 and 33. The control passages at 38 and 39 are formed within counterbores 63 coaxial with the valve bores 23 and 24 along circumferential valve edges 64 of the bores as more clearly seen in FIG. 3.

In the neutral position of the control valve as shown in FIG. 1, all valve passages at 36, 37, 38 and 39 are open. In response to angular displacement of the balance lever 28 to actuate one of the valve pistons, the valve passage at 36 or 37 associated therewith is enlarged while the auxiliary valve passage at 38 or 39 for the same valve piston is reduced. The reverse is true of the other valve piston displaced by the bias of spring 25 or 26 insofar as the enlargement and reduction of the valve passages are concerned.

Feedback passages 40, 41 are formed in the valve pistons and extend between each of the auxiliary grooves 32 and 33 and feedback chambers 42, 43 into which the springs 25 and 26 extend. In the neutral position of the control valve, pressurized fluid in the pump supply passage 18 is conducted to the annular groove 34 in the valve body from which the fluid flows through the valve passage at 36 into the valve groove 30 in the valve piston 21. A valve connecting passage 44 conducts the fluid from groove 30 to groove 31 in valve piston 22 from which the fluid is exhausted through valve passage at 35 and groove 37 in the valve body to the return passage 20 in fluid communication with reservoir 5. The connecting passage 44 is in fluid communication with the larger cylinder chamber 16 of the servomotor section 2 through passage 45.

A feedback line 46 connects power steering pump 4 through two branch lines 47 and 48 and feedback control grooves 32 and 33 to the feedback chambers 42 and 43. Flow restrictors 49 and 50 are disposed in the branch lines 47 and 48 while an adjustable flow restrictor 51 is disposed in the feedback line 46. Manual, electrical or hydraulic means may be provided for selectively adjusting the flow restrictor 51. A pressure reducing valve 52 interconnects the flow restrictor 51 with the two branch line flow restrictors 49 and 50 and limits the pressure in the feedback chambers 42 and 43 to a maximum value by a well known "cut-off" effect.

As shown in FIG. 2, a rotary seal 53 is provided at the bearing end of pinion 7 through which pressurized fluid is conducted to passage 45 connected to the larger cylinder chamber 16. Axially spaced sealing rings 54 and 55 on the valve body 19 prevent leakage of fluid fed to the feedback chambers from feedback passage 46. A piston rod seal 56 is mounted by the cylinder 14 at the axial end from which the piston rod extends. Thus, the physical arrangement of the steering gear as shown in FIG. 2 requires only housing mounted seals 53, 54, 55 and 56 to support the supply of pressurized fluid from pump 4 to the control valve section 3.

The valve actuating balance lever 27 has two contact surfaces 57 and 58 aligned with planes intersecting on its pivotal axis through the spindle 28 to an obtuse angle. The surfaces 57 and 58 bear against the arcuate end surfaces of the valve pistons 21 and 22 and are so dimensioned as to form right angles with longitudinal axes of the valve pistons when the balance lever is angularly displaced from its neutral position to a working position for one of the valve pistons with the other just closing off its main passage at 36 or 37. The ends 59 and 60 of the actuating balance lever 27 are engageable with stop surfaces 61 and 62 on the valve body to limit angular displacement of the steering spindle and the pinion 7 formed thereon.

Referring still to FIG. 1, in the neutral position of control valve section 3, fluid under the pump pressure in the small servomotor chamber 13 is conducted to the reservoir 5 with equal pressure reduction, for example, at the two open valve passages at 36 and 37. Accordingly, the fluid in passage 44 between the valve pistons at one-half the pump pressure pressurizes the larger servomotor chamber 16 through passage 45 resulting in a pressure differential on piston 10 balancing the opposed surface area differential so as to apply no load on the piston rod 9 in the neutral position of the control valve section. When the balance lever 27 is angularly displaced clockwise, for example, the valve passages at 36 and 39 are closed to effect a pressure build-up in the smaller chamber 13 to move the piston 10 in a right hand direction. Fluid in the larger chamber 16 is then conducted through passage 45 and the open valve passage at 37 to the reservoir 5. With an increase in resistance to movement of the piston rod 9, the pump pressure in chamber 13 increases. The increasing pressure of the fluid is applied through flow restrictors 51 and 50, and feedback groove 33 to feedback chamber 43, since the valve passage at 39 is closed to prevent pressure loss to the reservoir 5. Since the valve passage at 38 is opened, no increase in pressure in reaction chamber 42 is then possible to exert a reaction pressure in the valve closing direction. Flow restrictor 49 —then conducts feedback flow to reservoir 5 from the pump while no such flow occurs through the flow restrictor 50. If the flow restrictor 51 is adjusted in size equal to that of flow restrictor 49, equal pressure gradients will be created at both such flow restrictors in which case the feedback pressure in feedback chamber 43 will be one-half of that prevailing in chamber 13. Such feedback pressure in chamber 43 will act on the valve piston 22 with spring 26 to oppose its displacement by the balance lever 27 and provide a road resistance sense to the driver applying the valve actuating force to the balance lever through handwheel 6. The magnitude of the feedback force applied to balance lever 27 depends on the output pressure of pump 4 and the adjusted size of the flow restrictor 51. Thus, when the flow restrictor 51 is fully closed, a zero feedback pressure results in chamber 43 and no feedback is generated. If the flow restrictor 51 is fully opened, the feedback pressure in chamber 43 will be substantially equal to the pressure in servomotor chamber 13 to generate a feedback force on lever 27 of maximum value as a direct function of servo pressure.

Figure 4:
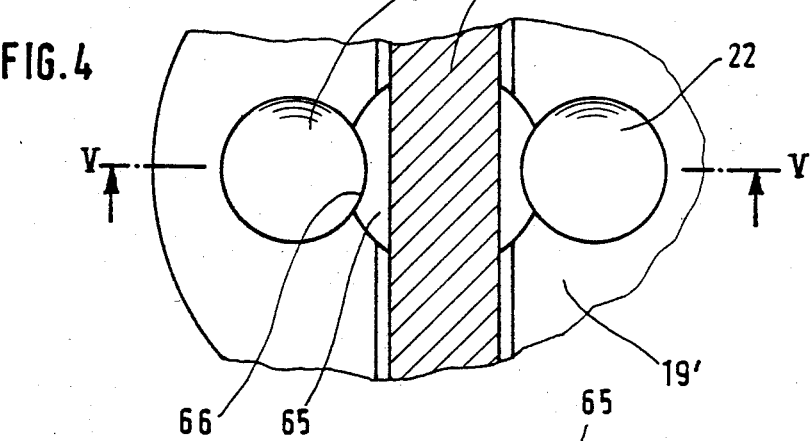
FIG. 4 is a partial side section view through the control valve showing a modification of the construction as shown in FIG. 1.
Figure 5:
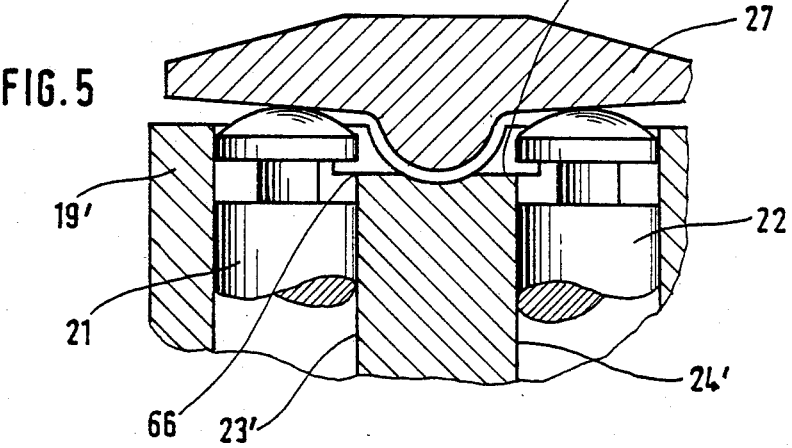
FIG. 5 is a top view taken substantially through a plane indicated by section line 5—5 in FIG. 4.

When the balance lever 27 is displaced in a counterclockwise direction as viewed in FIG. 1, the valve passages at 37 and 38 are closed while the valve passages at 36 and 39 are opened. Both servo chambers 13 and 16 are then pressurized by the same amount causing movement of piston 10 in a left hand direction. Where a 2:1 pressure surface area ratio on the piston exists, for example, the power steering pump 4 must apply the same pressure in both directions. Since the feedback chambers 42 and 43 are supplied with fluid through the flow restrictors 51, 40 and 50 directly from pump 4, equal size flow restrictors and valve pistons may be utilized. FIGS. 4 and 5 illustrate a modification of the control valve section, wherein a rotatable valve body 19' is formed with valve bores 23' and 24' within the valve pistons 21 and 22 are mounted for engagement with the balance lever 27. The valve bores 23' and 24' are intersected by a single counterbore 65 in the valve body between them to form feedback passage controlling edges 66 along circumferential portions of the bores at the axial ends from which the valve pistons project.

What is claimed is:

1. In a hydraulic system, a pump, a reservoir, a servomotor having a piston with opposed pressure surfaces, a control valve having two valve pistons respectively controlling two valve flow passages through which fluid from the pump is conducted to the servomotor and the reservoir, means for actuating the valve pistons, and feedback means exerting reaction forces on the valve pistons in response to actuation thereof for resisting valve displacement in directions opening the two valve flow passages, the improvement comprising spring means respectively biasing the valve pistons (21, 22) in directions closing the two valve flow passages (36, 37), and control passage means for controlling the reaction forces only on one of the valve pistons as a function of said displacement thereof in the opening direction, said control passage means including separate conduits (47, 48) respectively connected by the two valve pistons to the feedback means, flow restricting means (49, 50, 51) operatively connecting the pump to said separate conduits for pressurization of the feedback means, and exhaust means (38, 39) opened in response to said closing of the valve flow passages for depressurizing the feedback means.

2. In a hydraulic steering system, a power-steering pump, a reservoir, a servomotor having a piston with an opposed pressure surface area ratio of approximately 1:2 and a control valve having two valve pistons respectively controlling valve flow passages through which fluid from the pump is conducted to the servomotor and the reservoir, including means for actuating the valve pistons, and feedback means acting on the valve pistons in response to actuation thereof, the improvement comprising spring means respectively biasing the valve pistons (21, 22) in directions closing the valve flow passages (36, 37), and control passage means (38, 39) closed in response to positive engagement of the valve pistons by the actuating means (27) for controlling pressurization of the feedback means (42, 43), the feedback means including a pair of feedback chambers (42, 43), a pair of interconnected flow restrictors (49, 50) respectively connected to said feedback chambers, an additional flow restrictor (51) connected in common to said pair of interconnected flow restrictors and pressure conduit means (17) connecting the pump (4) to said additional flow restrictor for pressurizing the feedback chambers respectively through the pair of flow restrictors.

3. The improvement as defined in claim 2 wherein the control valve (3) has a neutral position in which operating flow through the valve flow passages (36, 37) is larger than feedback flow through the control passage means (38, 39).

4. The improvement as defined in claim 3 wherein the actuating means comprises a balance lever (27) having, contact surfaces (57, 58) in planes intersecting at an obtuse angle and engaging the valve pistons in operating positions thereof, displaced from the neutral position of the control valve, at which the contact surfaces are perpendicular to longitudinal axes of the valve pistons.

5. The improvements as defined in claim 4 wherein the control valve further includes a valve body (19) having spaced bores (23, 24) formed therein within which the valve pistons are slidably mounted, the separate passage (38, 39) being established along circumferential edge portions of the bores.

6. The improvement as defined in claim 5 wherein said circumferential edge portions of the bores are formed by intersection of the bores with a cylindrical counterbore in the valve body disposed between the bores.

7. The improvement as defined in claim 6 including stop means (61, 62) on the valve body (19) engageable by the balance lever (27) for limiting angular displacement of the actuating means.

8. The improvement as defined in claim 7 including means for selectively adjusting the additional flow restrictor (51).

9. The improvement as defined in claim 8 including pressure reducing valve means (52) connected between said additional flow restrictor (51) and the pair of flow restrictors (49, 50) for limiting the pressure in the feedback chambers (42, 43) to a maximum value.

10. The system as defined in claim 9 including a steering gear mechanism (1) having a rack (8) and a pinion (7) enmeshed with the rack, the servomotor (2) including a piston rod (9) connected to the piston (10) and on which the rack is formed, and a pressure chamber (13) through which the piston rod extends from the piston and within which the rack and the pinion are disposed.

11. The system as defined in claim 10 wherein the pinion (7) is rotationally fixed to the valve body (19), the valve body having opposite axial end faces, the pinion (7) extending from one of said end faces into said pressure chamber (13) of the servomotor, said actuating means including a steering spindle (28) connected to the balance lever (27) and extending from the other axial end face of the valve body.

12. The system as defined in claim 11 wherein the servomotor further includes a cylinder housing (14) enclosing the pressure chamber (13) and rotatably mounting the valve body (19) of the control valve (3), a rod seal (56) mounted in the cylinder housing through which the piston rod extends, said pressure conduit means (17) being connected to the housing in spaced adjacency to the rod seal, and supply means (18) extending through the valve body from said one of the end faces thereof for establishing fluid communication between the control valve and the pressure chamber (13).

13. The improvement as defined in claim 2 including means for selectively adjusting the additional flow restrictor (51).

14. The improvement as defined in claim 13 including pressure reducing valve means (52) connected between said additional flow restrictor (51) and the pair of flow restrictors (49, 50) for limiting the pressure in the feedback chambers (42, 43) to a maximum valve.

15. In a fluid power steering system having an unbalanced piston servomotor (2), a servo pump (4), and a control valve (3) including a valve body (19), a pair of spring-biased valve pistons (21, 22) of equal size movably mounted in the valve body, actuating means (27) engageable with the valve pistons for displacement thereof in opening directions and feedback means (42, 43) for resisting said displacement of the valve pistons, the improvement residing in valve controlled passage means (38, 39) in the valve body for controlling directional depressurization of the feedback means in response to said displacement of the valve pistons, and flow restrictor means (49, 50, 51) directly connecting the pump to the feedback means for directionally equalized pressurization of the feedback means differently from pressurization of the servomotor under control of the valve pistons.

16. In a fluid power steering system including an unbalanced servomotor (2) having a piston (10) with opposed pressure surfaces of differential area and servo chambers (13, 16) to which said pressure surfaces are respectively exposed, a pump (4) in continuous direct fluid communication with one of the servo chambers (13) to which the pressure surface of smaller area is exposed, a control valve assembly (3) operatively connecting the pump to the other of the servo chambers (16) to which the pressure surface of larger area is exposed, actuating means (27, 35, 26) operatively connected to the control valve assembly for mechanical displacement thereof in valve opening and closing directions to control the servomotor and reaction pressure means for resisting the displacement of the control valve assembly in the valve opening directions, the improvement residing in said control valve assembly having a pair of equal sized valve pistons mechanically engageable by the actuating means, valve passage means (36, 37) responsive to displacement of the valve pistons in the valve opening and closing directions for controlling pressurization of the other of the servo chambers (16), and separate valve passage means (38, 39) responsive to said displacement of the valve pistons for controlling depressurization of the reaction pressure means, the reaction pressure means having a pair of reaction pressure chambers (42, 43) of equal size respectively pressurized to resist displacement of the valve pistons in the valve opening directions, and fluid conduit means (49, 50, 51) operatively connecting the pump to the separate valve passage means for pressurization of one of the reaction chambers differently from said pressurization of the servo chambers to resist displacement of one of the valve pistons in the valve opening direction while the other of the reaction chambers is depressurized.

17. The improvement as defined in claim 16 wherein the fluid conduit means includes flow restrictor means (49, 50) through which the pump is connected in parallel to the reaction chambers for equalizing the pressurization thereof.

* * * * *